United States Patent Office 2,725,388
Patented Nov. 29, 1955

2,725,388

METHOD OF PREPARING CHOLADIENIC ACID ESTERS

Seymour Bernstein, Pearl River, N. Y., and Merle V. Querry, Rivervale, N. J., assignors to American Cyanamid Company, New York, N. Y., a corporation of Maine No Drawing. Application September 30, 1954, Serial No. 459,548

5 Claims. (Cl. 260—397.1)

This invention relates to a method of preparing bile acids. More particularly, it relates to the preparation of choladienic acid esters.

It is well known that cancer is on the increase over the past decade. This is attributed by some to the fact that the life span has been greatly lengthened thus affording greater opportunity for contracting the disease; by others to present day living conditions. Cure of the disease is dependent upon early diagnosis. Recent publications indicate that a diagnostic cancer antigen may be useful in detection of the disease: Dowdy et al., Proc. Amer. Assoc. for Cancer Res. 1, page 12 (1954); Chang and Sprunt J. Am. Chem. Soc. 76, page 3213 (1954), etc. A component of these antigens has been bile acids such as choladienic acid and its esters, particularly the lower alkyl esters.

We have found a new method for the preparation of the lower alkyl esters of choladienic acid. These esters when prepared by the process of the present invention consist of a mixture of the $\Delta^{2,11}$ and $\Delta^{3,11}$-choladienic acid lower alkyl esters having the formulas:

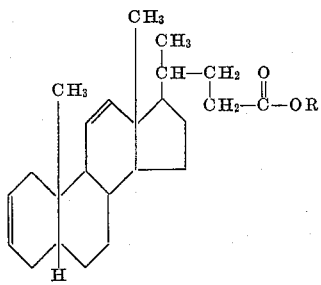

or

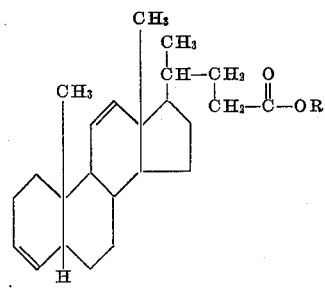

in which R is a lower alkyl radical, such as methyl, ethyl, propyl, butyl, etc. These mixtures are used as such in the diagnostic antigens referred to hereinbefore.

The compounds of the present invention are prepared by reacting $\Delta^{11}$-lithocholenic acid with a lower alkyl alcohol such as methanol, ethanol, propanol, butanol, etc., preferably in the presence of acetyl chloride. In place of acetyl chloride we can use acid catalysts such as hydrogen chloride, etc. The lower alkyl ester of $\Delta^{11}$-lithocholenic acid is then reacted with para-toluenesulfonyl chloride in the presence of a tertiary amine. The product obtained is the paratoluenesulfonate of the lower alkyl ester of $\Delta^{11}$-lithocholenic acid. This compound is then heated with an organic base containing nitrogen, such as pyridine, collidine, and the like, which removes the paratoluenesulfonate radical and produces a mixture of the $\Delta^{2,11}$ and $\Delta^{3,11}$-choladienic acid lower alkyl esters. This product can be purified by recrystallization from suitable solvents such as methanol, and the like.

The following example illustrates the general method for the preparation of a crystalline mixture of $\Delta^{2,11}$ and $\Delta^{3,11}$-choladienic acid lower alkyl esters.

Example 18.5 grams of $\Delta^{11}$-lithocholenic acid was dissolved in 185 ml. of ethanol and 9.5 ml. of acetyl chloride was added. The mixture was kept at room temperature for 16 hours protected from moisture by a calcium chloride drying tube. The mixture was diluted with water and the diluted mixture was extracted with ether. The ether extract was washed first with water, next with sodium bicarbonate solution and then with water. The washed solution was dried over anhydrous sodium sulfate, and the dried solution was concentrated under reduced pressure to give 20.0 grams of the ethyl ester as an oil.

The product described above was dissolved in 23.5 ml. of dry pyridine and cooled to 0° C. 10.6 grams of paratoluenesulfonyl chloride was dissolved in 18 ml. of dry pyridine and cooled to 0° C. The latter solution was added to the former and the mixture was kept in an ice bath for one hour and then at room temperature for 24 hours. Some crystals of pyridine hydrochloride separated, but were disregarded. Chopped ice was added and then iced dilute hydrochloric acid. The diluted aqueous solution was extracted with ether. The ethereal extract was washed first with cold dilute hydrochloric acid, next with cold water, then with cold aqueous sodium bicarbonate solution and finally with cold water. The washed ethereal solution was dried over anhydrous sodium sulfate and the dried solution was concentrated under reduced pressure to 24.3 grams of an oil.

The product immediately above was refluxed for three hours with 37.5 ml. of dry pyridine. Dilute hydrochloric acid was added and the mixture was extracted with ether. The ether extract was washed first with dilute hydrochloric acid, next with water, then with dilute aqueous sodium bicarbonate solution, and finally with water. The washed extract was dried over anhydrous sodium sulfate and then concentrated to an oil under vacuum. The oil was dissolved in methanol, and the solution was concentrated and chilled. The crystals were filtered and dried. A yield of 5.0 grams of a mixture of isomeric ethyl choladienates, melting at 68°–70° C., was obtained.

We claim:

1. A method of preparing a mixture of $\Delta^{2,11}$ and $\Delta^{3,11}$-choladienic acid lower alkyl esters which comprises reacting a lower alkyl ester of $\Delta^{11}$-lithocholenic acid with para-toluenesulfonyl chloride in the presence of a tertiary amine, subsequently heating the resulting product with an organic base containing nitrogen and recovering said mixture therefrom.

2. A method of preparing a crystalline mixture of ethyl $\Delta^{2,11}$ and $\Delta^{3,11}$-choladienates which comprises reacting the ethyl ester of $\Delta^{11}$-lithocholenic acid with para-toluenesulfonyl chloride in the presence of a tertiary amine, subsequently heating the resulting product with pyridine and recovering said crystalline mixture therefrom.

3. A method in accordance with claim 1 in which the tertiary amine is pyridine.

4. In a method of preparing a crystalline mixture of ethyl $\Delta^{2,11}$ and $\Delta^{3,11}$-choladienates the step which comprises heating the para-toluenesulfonyl acylate of ethyl cholenate with pyridine and recovering said mixture therefrom.

5. A method of preparing a crystalline mixture of ethyl $\Delta^{2,11}$ and $\Delta^{3,11}$-choladienates which comprises reacting $\Delta^{11}$-lithocholenic acid with ethanol and acetyl chloride to produce the ethyl ester of $\Delta^{11}$-lithocholenic acid, reacting said ethyl ester with para-toluenesulfonyl chloride in the presence of pyridine, subsequently heating the resulting product with pyridine and recovering said crystalline mixture therefrom.

References Cited in the file of this patent

UNITED STATES PATENTS 2,387,706    Reichstein _____ Oct. 23, 1945

FOREIGN PATENTS 242,994    Switzerland _____ Dec. 2, 1946